(12) United States Patent  
Araki

(10) Patent No.: US 10,846,362 B2  
(45) Date of Patent: Nov. 24, 2020

(54) INFORMATION PROCESSING APPARATUS, INFORMATION PROCESSING METHOD, DATA STRUCTURE AND PROGRAM

(71) Applicant: NEC Corporation, Tokyo (JP)

(72) Inventor: Takuya Araki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 120 days.

(21) Appl. No.: 16/080,159

(22) PCT Filed: Mar. 8, 2017

(86) PCT No.: PCT/JP2017/009140  
§ 371 (c)(1),  
(2) Date: Aug. 27, 2018

(87) PCT Pub. No.: WO2017/154946  
PCT Pub. Date: Sep. 14, 2017

(65) Prior Publication Data  
US 2019/0050371 A1  Feb. 14, 2019

(30) Foreign Application Priority Data  
Mar. 9, 2016  (JP) ................. 2016-046028

(51) Int. Cl.  
*G06F 17/16* (2006.01)  
*G06F 9/30* (2018.01)

(52) U.S. Cl.  
CPC ............ *G06F 17/16* (2013.01); *G06F 9/3004* (2013.01); *G06F 9/30036* (2013.01)

(58) Field of Classification Search  
CPC ..... G06F 17/16; G06F 9/30036; G06F 9/3004  
USPC ......................................................... 708/520  
See application file for complete search history.

(56) References Cited

U.S. PATENT DOCUMENTS 10,275,479 B2 *  4/2019  Zhao ..................... G06F 16/22  
2016/0179574 A1 *  6/2016  Merrill, III ............. G06F 7/523  
718/106

FOREIGN PATENT DOCUMENTS

JP  03-262077 A  11/1991  
JP  2001-209631 A  8/2001

OTHER PUBLICATIONS

Richard Barrett, et. al. "Templates for the Solution of Linear Systems: Building Blocks for Iterative Methods", 2nd Edition, Society for Industrial Applied Mathematics, pp. 57-63.  
Kiran Kumar Matam, et al., "Accelerating Sparse Matrix Vector Multiplication in Iterative Methods Using GPU", Proceedings of the 2011 International Conference on Parallel Processing, IEEE, Sep. 13, 2011. pp. 612-621.  
International Search Report for PCT/JP2017/009140 dated Jun. 6, 2017 [PCT/ISA/210].

* cited by examiner

*Primary Examiner* — Tan V Mai  
(74) *Attorney, Agent, or Firm* — Sughrue Mion, PLLC

(57) ABSTRACT

An information processing apparatus comprises a first conversion part storing a partial matrix for columns having a predetermined number or more of non-zero elements among columns in a matrix in a first format, and a second conversion part storing a partial matrix for the other columns in the matrix in a second format.

17 Claims, 14 Drawing Sheets

FIG. 12

|  | SENTENCE 1 | SENTENCE 2 | ... |
|---|---|---|---|
| this | 1 |  |  |
| is | 1 |  |  |
| a | 1 | 1 |  |
| pen | 1 |  |  |
| I |  | 1 |  |
| am |  | 1 |  |
| boy |  | 1 |  |
| ... |  |  |  |

SENTENCE 1: this is a pen
SENTENCE 2: I am a boy

|  | Mr. A | Mr. B | ... |
|---|---|---|---|
| BOOK 1 | 1 |  |  |
| TEA | 2 |  |  |
| SWEET | 1 | 2 |  |
| NOTE |  | 1 |  |
| CD 1 | 1 | 1 |  |
| BOOK 2 |  | 1 |  |
| CD 2 |  | 1 |  |
| ... |  |  |  |

INFORMATION PROCESSING APPARATUS, INFORMATION PROCESSING METHOD, DATA STRUCTURE AND PROGRAM

DESCRIPTION OF RELATED APPLICATION

This application is a National Stage of International Application No. PCT/JP2017/009140, filed on Mar. 8, 2017, which claims priority from Japanese Patent Application No. 2016-046028 (filed on Mar. 9, 2016), and the entire disclosure thereof is incorporated by reference into the present application.

The present invention relates to an information processing apparatus, an information processing method, data structure and program, particularly relates to a vector calculator, a matrix storing method for the vector calculator and a matrix vector multiplication method, data structure for the vector calculator as well as program for the vector calculator.

BACKGROUND

Sparse matrix means a matrix in which almost data is 0 (zero). A method has been known, where, upon storing, field(s) (element(s)) of 0 included in the sparse matrix is skipped (omitted) in order to reduce data volume and time required for matrix vector multiplication calculation. For example, Non-Patent Literature 1 discloses a sparse matrix storing method and a sparse matrix vector multiplication method.

Patent Literature 1 discloses a related technology where diagonal elements are deleted from a matrix, the matrix is divided into an upper triangular matrix and a lower triangular matrix, and they are stored in JDS (Jagged Diagonal Storage) format.

In addition, Patent Literature 2 discloses a technology where a matrix input in CRS (Compressed Row Storage) format is converted into a matrix in JDS format.
[Patent Literature 1]
Japanese Patent Kokai Publication No. JP-H03-262077A
[Patent Literature 2]
Japanese Patent Kokai Publication No. JP2001-20963A
[Non-Patent Literature 1]
Richard Barrett, et. al "Templates for the Solution of Linear Systems: Building Blocks for Iterative Methods, 2nd Edition", SIAM, pp.57-63 <URL: http://www.netlib.org/templates/templates.pdf>.

SUMMARY

The entire disclosed contents of the above identified Patent Literatures and Non-Patent Literature are regarded as incorporated herein by reference thereto. The following analysis has been made by the inventor of the present invention.

FIG. 8 exemplifies a sparse matrix storing method in CRS (Compressed Row Storage) format. In the sparse matrix storing method in CRS format, values of elements which are not zero (referred to as "non-zero element(s)" hereinafter) are stored in a one-dimensional array. Also, the non-zero elements are sequentially stored in a row direction, and when there is no more non-zero element in the row, the non-zero elements in a next row are stored. For example, in an example shown in FIG. 8, the non-zero elements are stored in a one-dimensional array in a sequence of 1, 2, 3, 4, . . . , 10. In addition, column indexes of the non-zero elements in the original matrix are also stored in a one-dimensional array in a similar manner. For example, in an example shown in FIG. 8, "1" has been stored in a column having column index 0 (zero) (i.e. 0th column), thus 0 (zero) is stored. Herein, assume that the column index and the row index start from 0 (zero). In addition, "2" has been stored in a column having column index 2 (i.e. the 2nd column), thus 2 is stored as a next value. Further, in order to store row partition (end), offset values denoting "from what the row begins [, and at what element each row ends]" are stored in a one-dimensional array. For example, the 0th row begins from 0th element, thus the initial element is 0. In addition, <since the 0th column includes 3 elements of non-zero>[sic, the 0th row ends at "3"], the 1st row starts from 3rd element. Accordingly, the next element of this array is 3.

FIG. 9 exemplifies a case where sparse matrix vector multiplication is performed in the sparse matrix storing method in CRS format. For example, 0th element of a matrix vector multiplication product may be calculated by calculating an inner product of 0th row of the matrix and a vector. It is apparent from the arrays (values, column indexes) shown at right side in FIG. 8 that 0th row includes 1, 2, 3 as the non-zero elements and the column indexes thereof are 0, 2, 4 respectively. In addition, the row ends may be acquired from the offset values shown in FIG. 8. The 0th element of the matrix vector multiplication products may be calculated by respectively calculating multiplication products of the values 1, 2, 3 and 1, 3, 5 as the values of 0th element, 2nd element, 4th element of the vector, and then calculating sum of the values of the calculated multiplication products. The other elements of the matrix vector multiplication products may be similarly calculated.

In a case where the matrix vector multiplication products are calculated with a vector calculator, calculations are performed under a state where the values of each row and the corresponding vector are loaded onto a vector register. Herein, when each row does not absolutely include many number of non-zero elements, there are cases where the number of non-zero elements is insufficient for the length of the vector register. However, the vector calculator suffers from a problem upon calculation that the vector calculator cannot perform the calculation at a high speed when effective data length of the vector register (i.e. vector length) is not so long.

Sparse matrix storing methods in JDS (Jagged Diagonal Storage) format are known as a method for solving such problem. FIG. 10 exemplifies a sparse matrix storing method in JDS format. In the sparse matrix storing method in JDS format, non-zero elements are shifted leftwards in the same row. Next, the rows are permutated (sorted) in a descending order in the number of non-zero elements in each row. In an example shown in FIG. 10, the 1st row and the 2nd row are permutated (replaced) each other, and thereby the number of non-zero elements [in each row] results in 3, 3, 2, 2. After that, the non-zero elements aligned in columns (column directions) are stored in a one-dimensional array. In the example shown in FIG. 10, the data is stored in a sequence of 1, 6, 4, 9, . . . . In addition, like as the CRS format, the values of corresponding column indexes are stored in a one-dimensional array. For example, value 1 has been stored in the column having column index 0 (zero) (i.e., 0th column), thus 0 (zero) is stored. Next value 6 has been also stored in the column having column index 0 (zero) (i.e., 0th column), thus 0 (zero) is stored. In addition, in order to store ends of the columns in the left-shifted matrix, offset values are stored in a one-dimensional array. For example, with respect to the first column (i.e., 0th column), it starts from the initial element, thus 0 is stored. The number of elements in the first column (i.e., 0th column) is 4, thus the next column (i.e., 1st column) starts from 4th element. Accordingly, the next element of this array is 4. In addition, in a case of JDS format, it is required to store information denoting how the columns [sic, rows] are permutated. In a case of the example shown in FIG. 10, rows 0, 1, 2, 3 (i.e. 0th, 1st, 2nd and 3rd rows) in the row-permutated matrix correspond to rows 0, 2, 1, 3 in the original matrix, thus the values thereof are stored. Herein, instead of storing of these values, information denoting which rows in the row-replaced matrix correspond to the rows in the original matrix may be stored.

FIG. 11 exemplifies a case of the sparse matrix storing method in JDS format, where sparse matrix vector multiplication is performed. In this case, multiplication products of contents of each column and an input vector are added to a resultant vector denoting results as matrix vector multiplication products. For example, referring to an initial column, it is apparent from the arrays shown in FIG. 10 that the value of the initial row is 1, and the value has been present in the column having column index 0 (i.e., 0th column). Therefore, 1*1 as a multiplication product of the value 1 as a matrix element and 1 as the 0th element of the input vector is added to an initial (0th) value of the resultant vector denoting the result as the matrix vector multiplication products. Next row has value 6 and the value has been present in 0th column, thus 6*1 is added to a next value in the vector denoting the result. Such operation is performed for all columns. After that, sparse matrix vector multiplication products may be obtained by permutating the values based on the row permutation information.

In a case where such matrix vector multiplication products are calculated with a vector calculator, calculations are performed under a state where data is loaded onto a vector register for every column. In a case of JDS format, since each column has been shifted leftwards, it is elongated rather than one row in a case of CRS format. Therefore, a vector length may be elongated in JDS format as compared to a case of CRS format.

However, there is a case in the sparse matrix storing method and the sparse matrix vector multiplication method stated above, where the vector length is not elongated to a sufficient length. The reason will be explained below.

Recently, machine learning for large scale data, referred to as big data analysis and the like, is performed more frequently. In such situation, the machine learning is performed based on matrix operation in many cases. In addition, in a case of the large scale machine learning, a target matrix is often a sparse matrix. FIG. 12 and FIG. 13 exemplify such cases.

FIG. 12 shows a sparse matrix denoting a document. In the matrix shown in FIG. 12, rows represent "words" and columns represent "sentence". In addition, elements in the matrix indicate the number of occurrence of each word in each sentence. When performing an operation referred to as "singular value decomposition" onto the matrix, topics of each sentence and words of each topic may be analyzed. Such analysis is referred to as latent semantic analysis.

On the other hand, FIG. 13 shows a sparse matrix denoting buying behavior by each user at an on-line store etc. In the matrix shown in FIG. 13, rows represent "items" and columns represent "users". Elements in the matrix indicate the number of each item purchased by each user. By performing the "singular value decomposition" onto the matrix, it may be realized to recommend an item which would likely to be purchased by a user.

Herein, in order to perform the singular value decomposition onto a sparse matrix, it is required to perform sparse matrix vector multiplication in the course of calculations. In addition, even in a calculation other than the singular value decomposition, the sparse matrix vector multiplication is often mainly performed as calculations for the sparse matrix.

By the way, when the matrices shown in FIG. 12 and FIG. 13 are converted into those in JDS format, they result in a form shown in FIG. 14. Herein, a gray section indicates an area where non-zero elements are present. In a case of such matrix, a lot of columns having insufficient column length for the vector length are possibly provided at a right side section in a matrix.

This is because the target data follows data distribution referred to as Power Law (or Zipf distribution). For example, it is known that several words occur at an extremely higher frequency as compared with the other words. In a case following Zipf distribution, when words are sorted in an order of the number of occurrence, the occurrence number of a word which occurs at the second frequency is one second of the occurrence number of a word which occurs at the highest frequency, and the occurrence number of a word which occurs at the third frequency is one third of the occurrence number of the occurrence number of the word which occurs at the highest frequency, and the like. Similarly, several items have a tendency that they are usually purchased at a frequency extremely higher than that of the other items.

In such cases, a section providing a vector having an insufficient length sometimes occurs, which disturbs improvement in calculation speed of vector matrix multiplication products by a vector calculator. Herein, the technologies disclosed in Patent Literatures 1, 2 are not directed to solving such problem.

Accordingly, there is a problem to calculate matrix vector multiplication products of a sparse matrix storing data following Power Low using a vector calculator at a high speed. It is an object of the present invention to provide an information processing method, information processing apparatus, program and data structure contributing to solve the problem.

An information processing apparatus of a first exemplary embodiment of the present disclosure comprises a first conversion part storing a partial matrix for columns having a predetermined number or more of non-zero elements among columns in a matrix in a first format. The information processing apparatus further comprises a second conversion part storing a partial matrix for the other columns in the matrix in a second format.

An information processing method of a second exemplary embodiment of the present disclosure comprises storing a partial matrix for columns having a predetermined number or more of non-zero elements among columns in a matrix in a first format, and storing a partial matrix for the other columns in the matrix in a second format. The method is associated with a concrete machine as the information processing apparatus comprising the first conversion part and the second conversion part.

A data structure of a third exemplary embodiment of the present disclosure is configured: to store a partial matrix for columns having a predetermined number or more of non-zero elements among columns in a matrix in a first format; and to store a partial matrix for the other columns in the matrix in a second format.

A program of a fourth exemplary embodiment of the present disclosure causes a computer to execute: a process of storing a partial matrix for columns having a predetermined number or more of non-zero elements among columns in a matrix in a first format; and a process of storing a partial matrix for the other columns in the matrix in a second format.

Herein, the data structure and program may be provided as a program product stored in a non-transitory computer-readable storage medium.

The meritorious effects of the present invention are summarized as follows.

According to the information processing method, information processing apparatus, program and data structure of the present invention, matrix vector multiplication products of a sparse matrix storing data following Power Low may be calculated with a vector calculator at a high speed. Namely, the present invention can transform an information processing apparatus into an information processing apparatus that can calculate matrix vector multiplication products of a sparse matrix storing data following Power Low on the vector calculator with a high speed.

BRIEF DESCRIPTION OF THE DRAWINGS

FIG. 12 is a diagram showing an example of a sparse matrix derived from a document.

FIG. 13 is a diagram showing an example of a sparse matrix derived from buying behavior.

MODES

Figure 1:
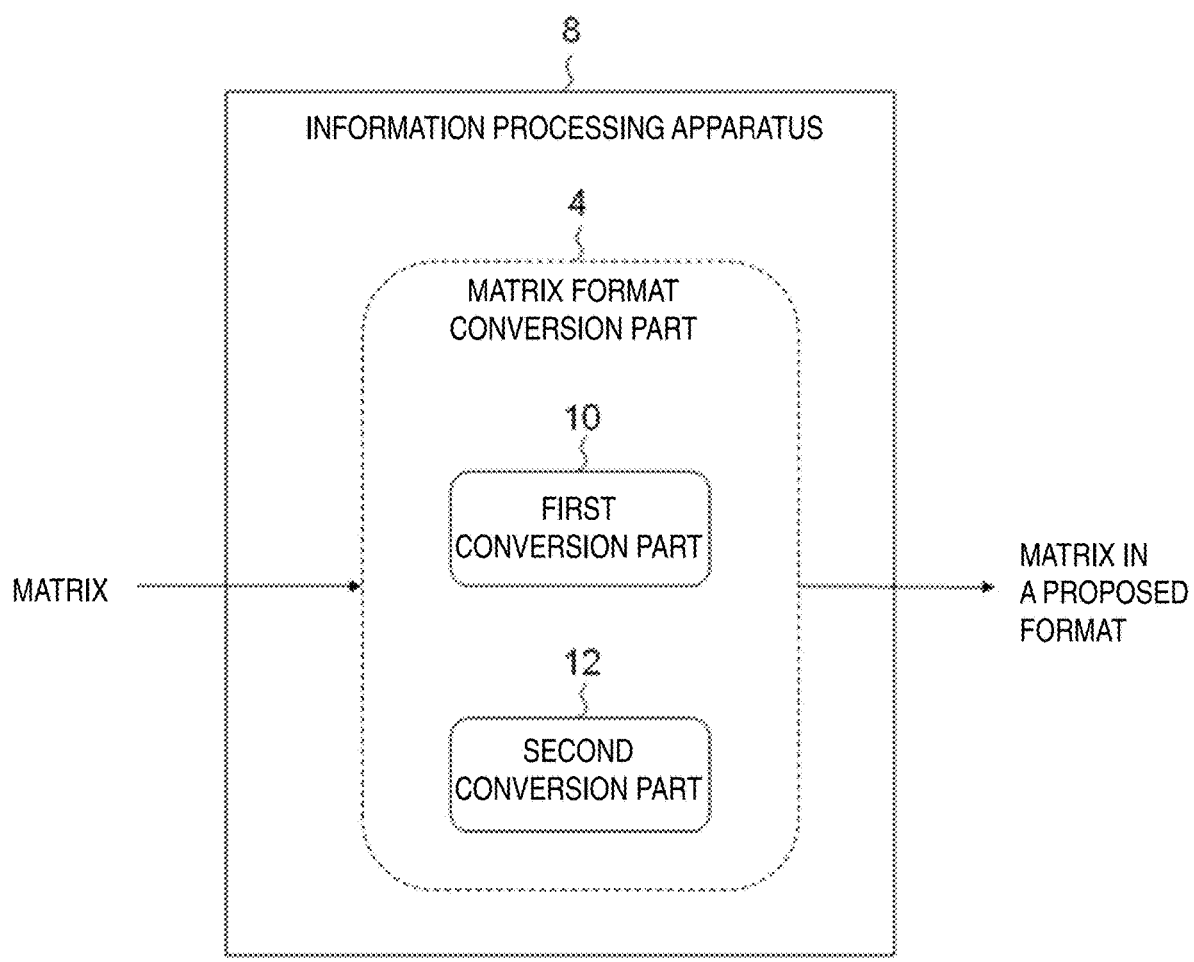
FIG. 1 is an exemplary block diagram showing a configuration of an information processing apparatus of one exemplary embodiment.

First, an overview of one exemplary embodiment will be explained. Herein, reference symbols described in the overview are merely for an exemplary purpose for helping understanding, but not intended to limit the present disclosure to an illustrated embodiment(s) in the drawings. In addition, in the following explanation, connection lines between blocks illustrated in drawings represent both of bidirectional connection and single-directional connection. One way arrow schematically indicates a main signal (data) flow, but does not exclude bidirectional flow. In addition, although there are ports or interfaces at the connection points of the input and output of each block in the figures, they are omitted.

FIG. 1 shows an exemplary block diagram of an information processing apparatus 8 of one exemplary embodiment. Referring to FIG. 1, the information processing apparatus 8 (for example, a vector calculator) comprises a first conversion part 10 and a second conversion part 12. The first conversion part 10 stores a partial matrix for columns having a predetermined number or more of non-zero elements among columns in a matrix in a first format (for example, JDS (Jagged Diagonal Storage) format in which elements in the matrix are stored in a column major order). The second conversion part 12 stores a partial matrix for the other columns in the matrix in a second format (for example, CRS (Compressed Row Storage) format in which elements in the matrix are stored in a row major order).

Figure 2:
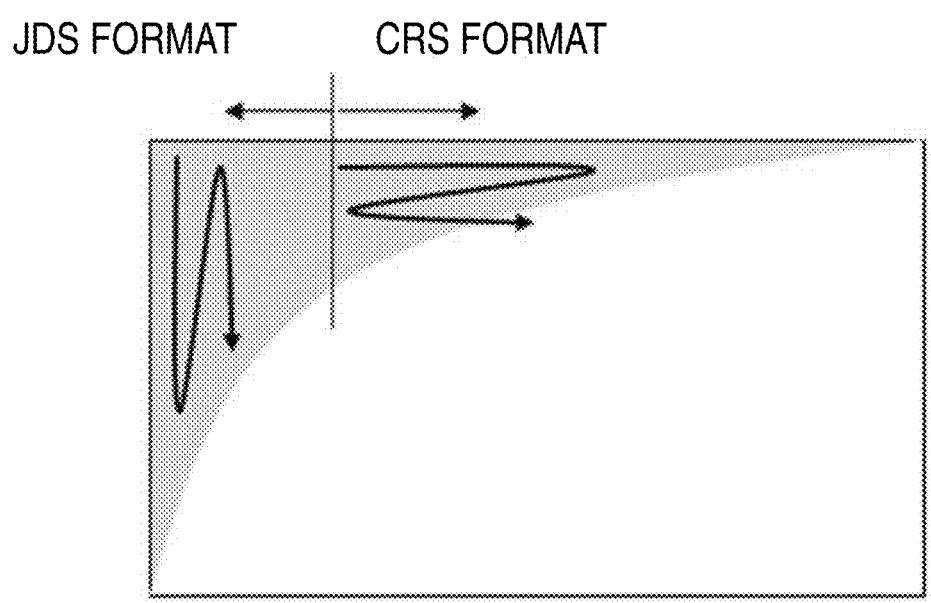
FIG. 2 is an explanatory view of one exemplary embodiment for storing, in combination, JDS format and CRS format.

As shown in FIG. 2, vector length may be elongated in all sections by, for example, storing a section having sufficient column length in JDS format and storing the other section in CRS format. If a sparse matrix is stored only in JDS format, there would be a case where performance speed is reduced due to shorter vector length upon calculation of sparse matrix vector multiplication products. On the other hand, according to one exemplary embodiment, even in such case, vector length is elongated, and thus the sparse matrix vector multiplication products may be calculated at a high-speed.

Exemplary Embodiment 1

Configuration

Next, a calculator of the first exemplary embodiment will be explained in detail with reference to drawings.

Figure 3:
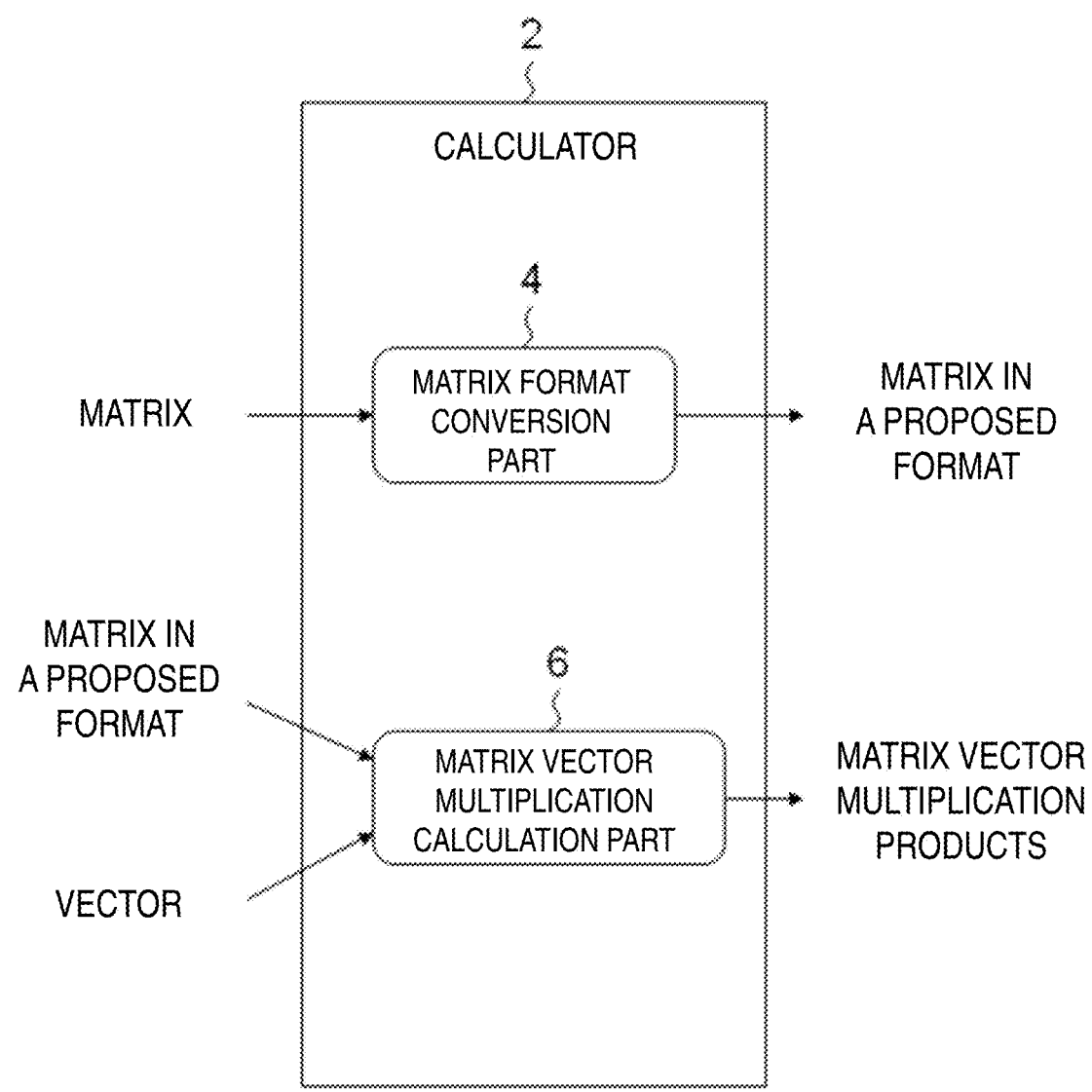
FIG. 3 is a block diagram showing a configuration of a calculator of a first exemplary embodiment.

Referring to FIG. 3, a calculator 2 (for example, a vector calculator) of the present exemplary embodiment comprises: a matrix format conversion part converting a matrix in another format to a format proposed in the present exemplary embodiment; and a matrix vector multiplication calculation part 6 to which a proposed format matrix and a vector are input and from which matrix vector multiplication products are output.

The matrix format conversion part 4 converts the input matrix to a matrix in a format proposed in the present exemplary embodiment. Also, the matrix format conversion part 4 stores the converted matrix in a memory, an external memory, etc.

On the other hand, the matrix vector multiplication calculation part 6 calculates matrix vector multiplication products of the matrix in the format proposed in the present exemplary embodiment, which is stored in the memory, etc. and a vector, by receiving them as input factors.

Operation

Figure 4:
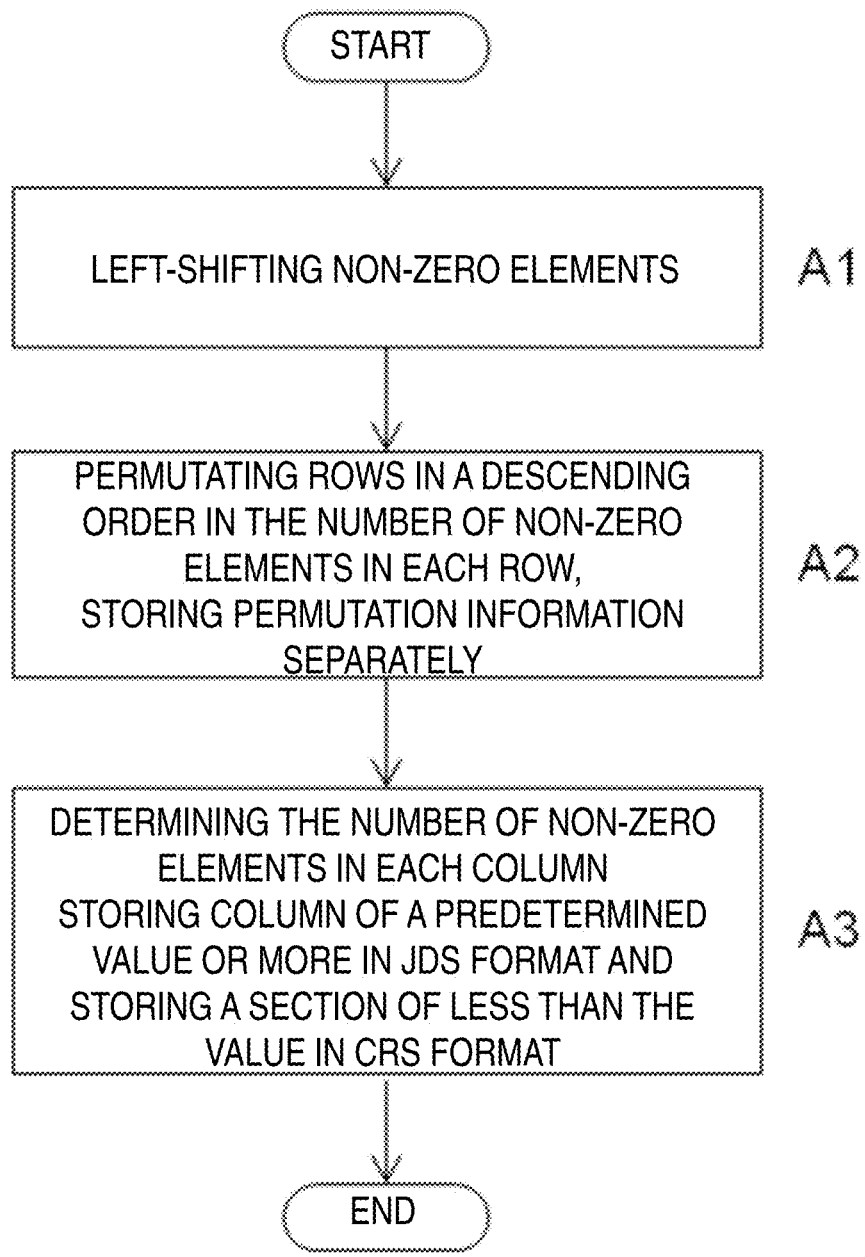
FIG. 4 is a flowchart showing an example of an operation by a matrix format conversion part in the first exemplary embodiment.

Next, an operation by the matrix format conversion part 4 will be explained in detail with reference to a flowchart in FIG. 4 and an example in FIG. 5.

Initially, the matrix format conversion part 4 shifts non-zero elements leftwards in a similar manner to a case of generating a matrix in JDS format (Step A1).

Next, the matrix format conversion part 4 permutates (i.e. sorts) the rows in a descending order in number of non-zero elements in each row. Also, the matrix format conversion part 4 separately stores information denoting the manner of the permutation (permutation information) (Step A2).

Next, the matrix format conversion part 4 determines the number of non-zero elements in each column, allocates JDS format to a section of a "predetermined value" or more, and allocates CRS format to a section of less than the predetermined value (Step A3). For example, in a case where the calculator 2 is a vector calculator, a vector register length of the vector calculator may be applied to the "predetermined value", provided that the predetermined value in the present disclosure is not limited thereto.

Figure 5:
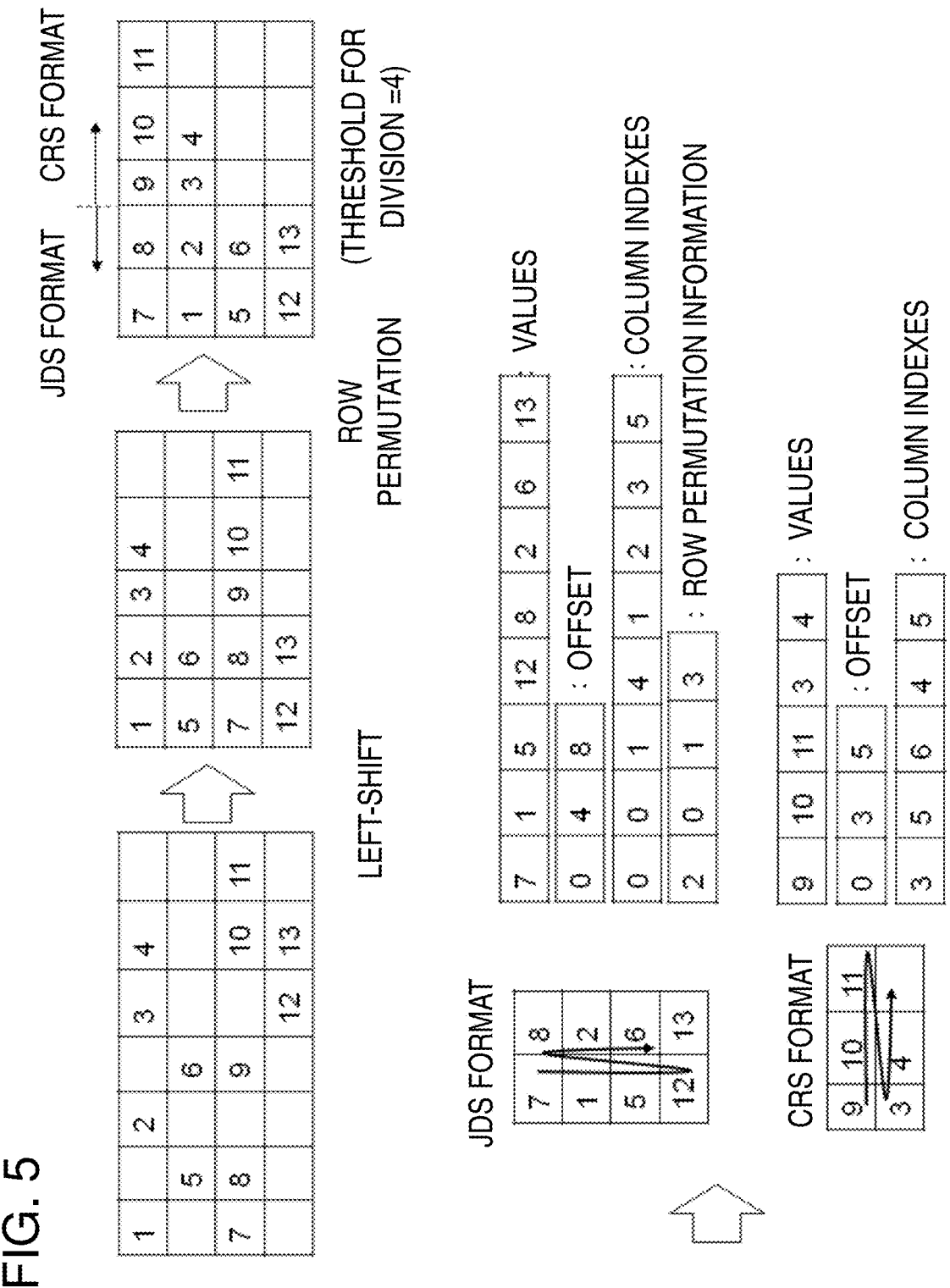
FIG. 5 is an explanatory view of an operation by a matrix format conversion part in the first exemplary embodiment.

In an exemplified case of FIG. 5, 4 is applied to the "predetermined value". In such case, the matrix format conversion part 4 stores 0th column and 1st column in JDS format and stores 2nd column, 3rd column and 4th column in CRS format.

When a matrix is stored in such operation sequence, a section to be stored in CRS format has a row alignment permutated from the original matrix, which is different from a case of ordinary CRS format. In addition, it is not required to store a section where non-zero elements are absent. Therefore, a case of FIG. 5 requires storing of only 2 rows. That is, offset may be shortened.

Herein, also considered is a method where the section to be stored in CRS format is not applied to the row permutation. Such method requires an offset having a length equivalent to the row number of the original matrix.

Figure 6:
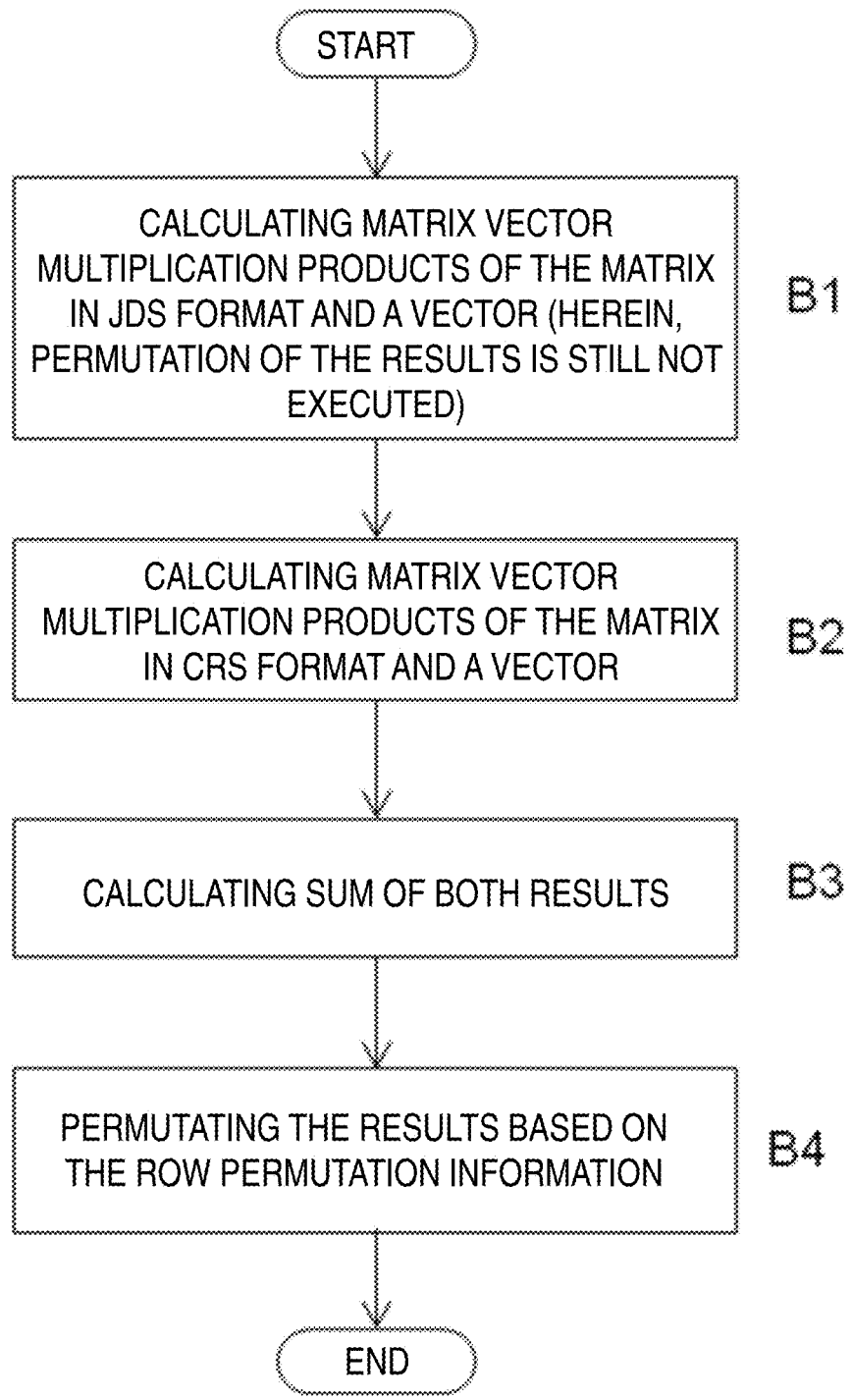
FIG. 6 is a flowchart showing an example of an operation by a matrix vector multiplication calculation part in the first exemplary embodiment
Figure 7:
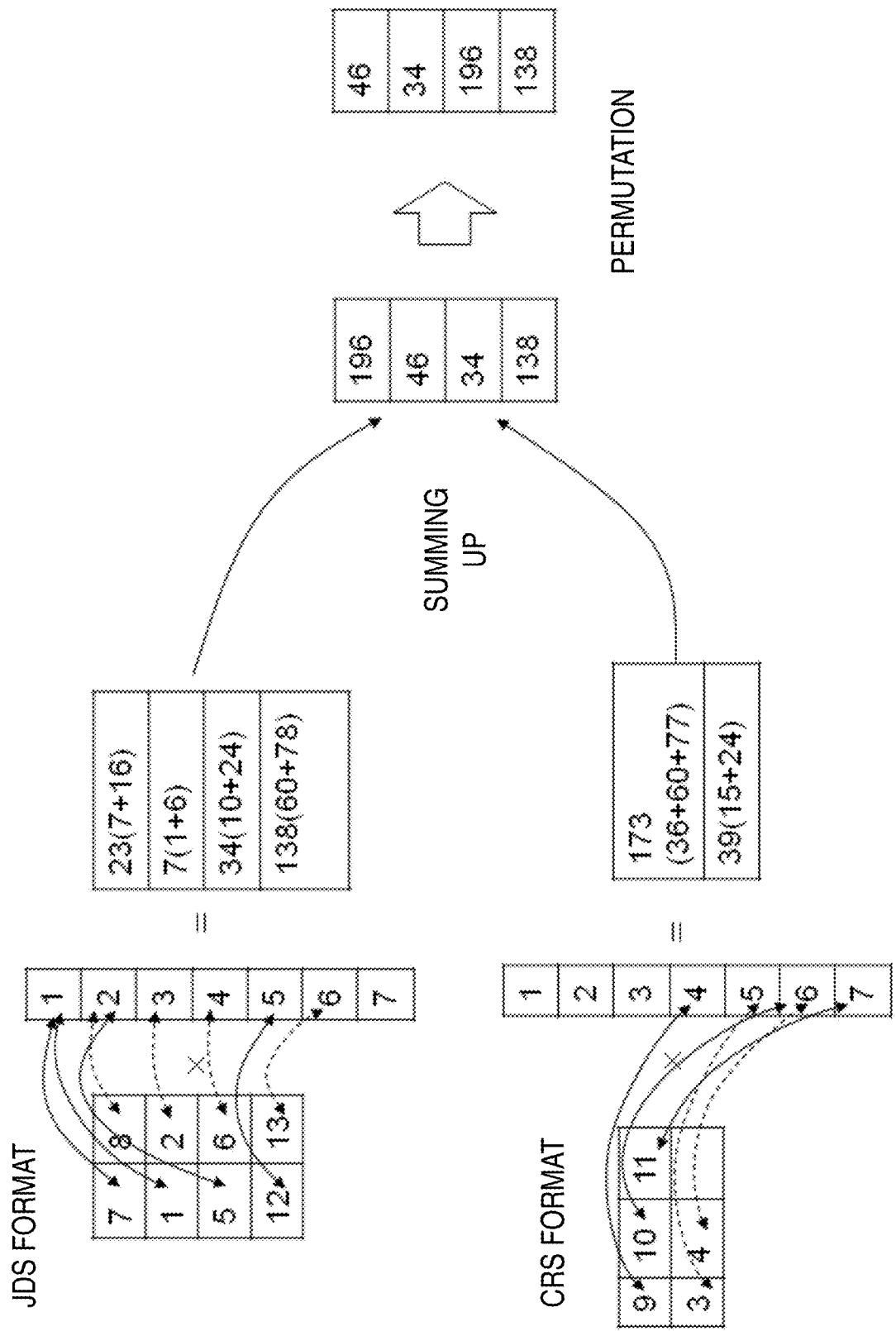
FIG. 7 is an explanatory view of an operation by the matrix vector multiplication calculation part in the first exemplary embodiment.
Figure 8:
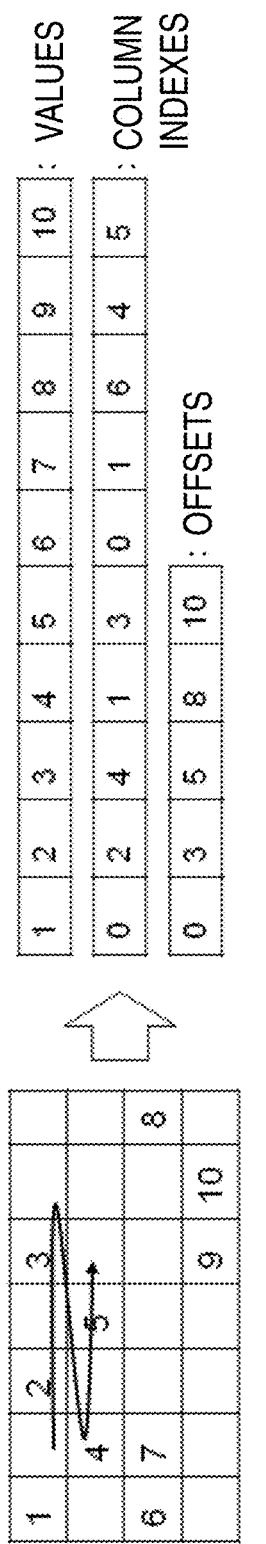
FIG. 8 is an explanatory view of a sparse matrix storing method in CRS format.
Figure 9:
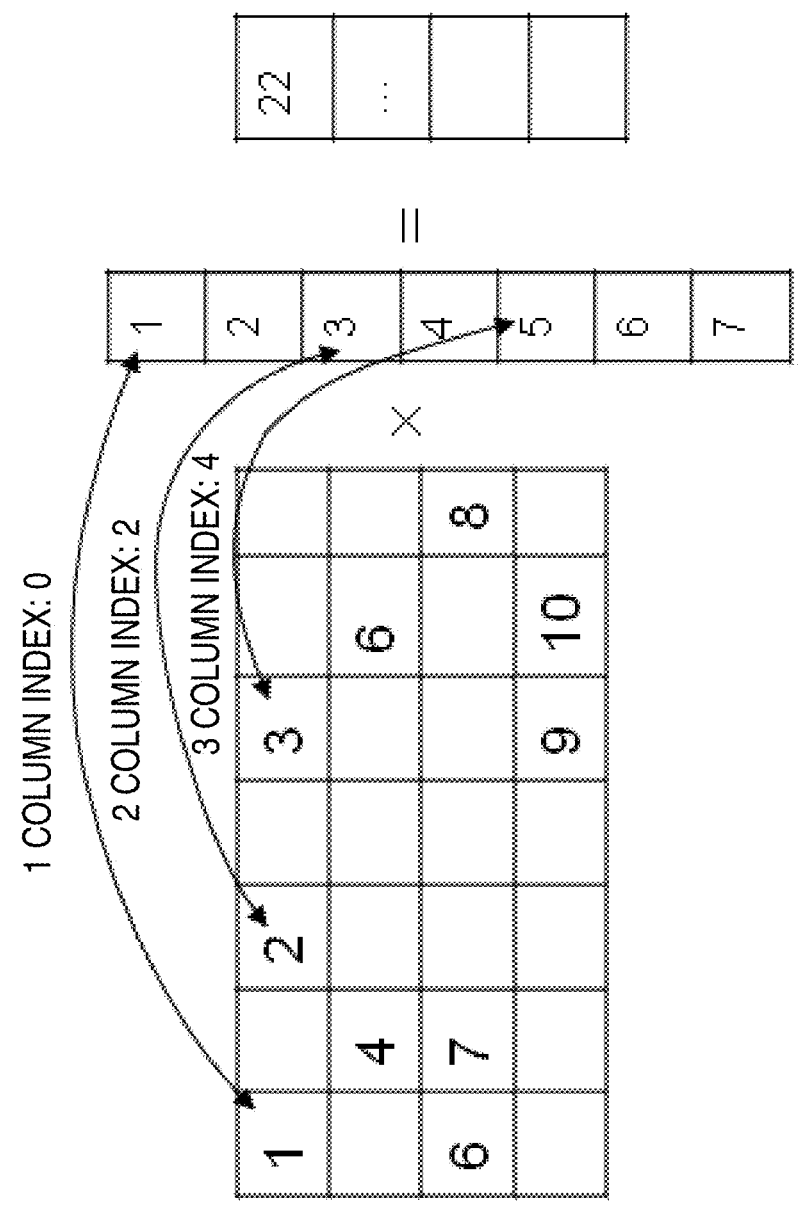
FIG. 9 is an explanatory view of a sparse matrix vector multiplication calculation in the sparse matrix storing method in CRS format.
Figure 10:
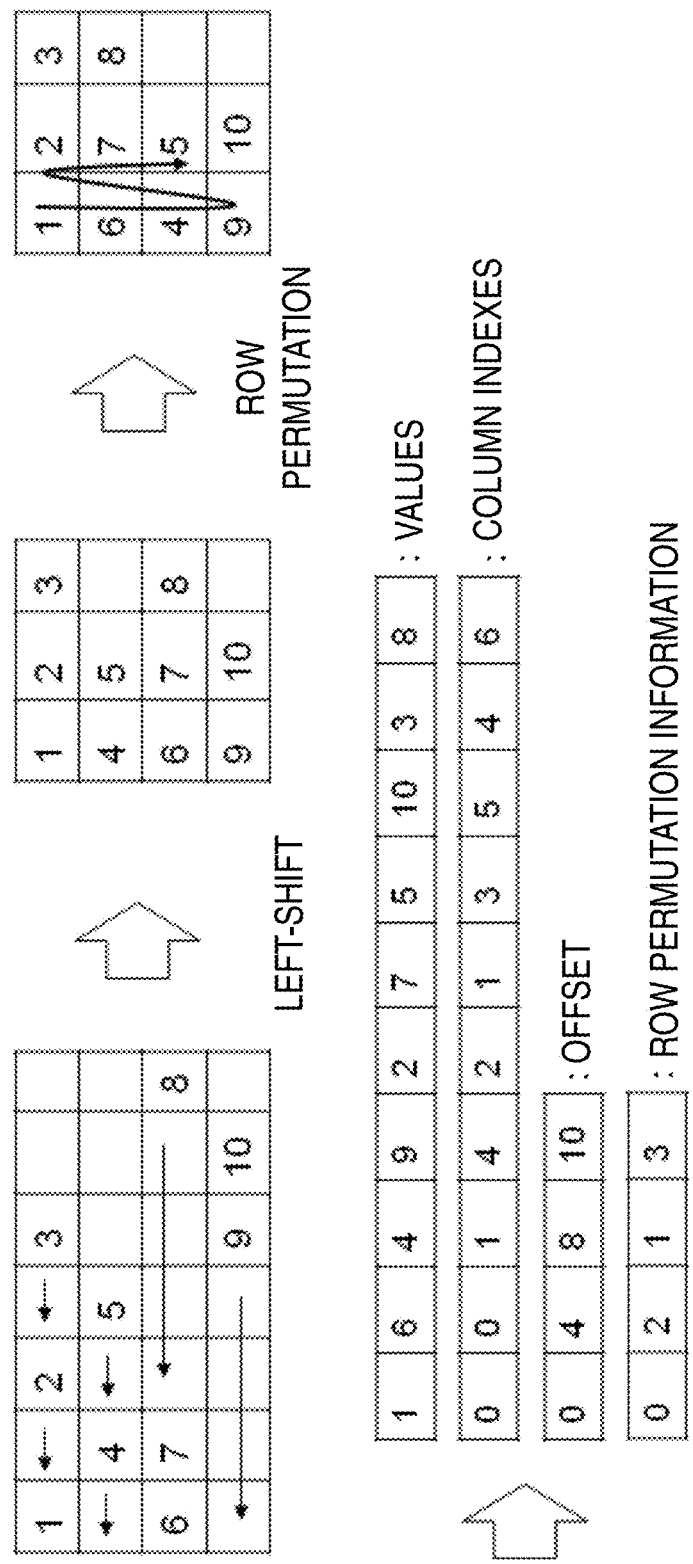
FIG. 10 is an explanatory view of a sparse matrix storing method in JDS format.
Figure 11:
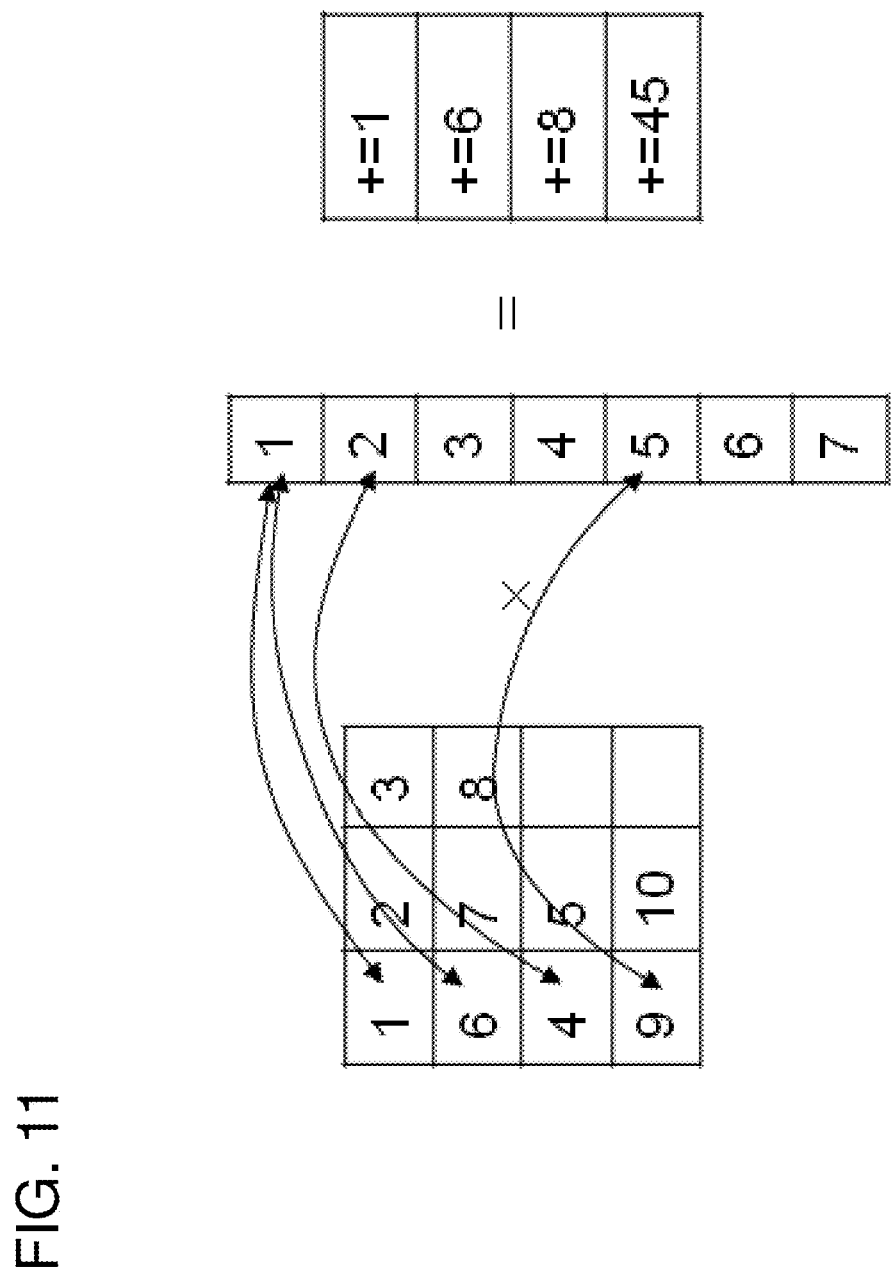
FIG. 11 is an explanatory view of a sparse matrix vector multiplication calculation in the sparse matrix storing method in JDS format.
Figure 14:
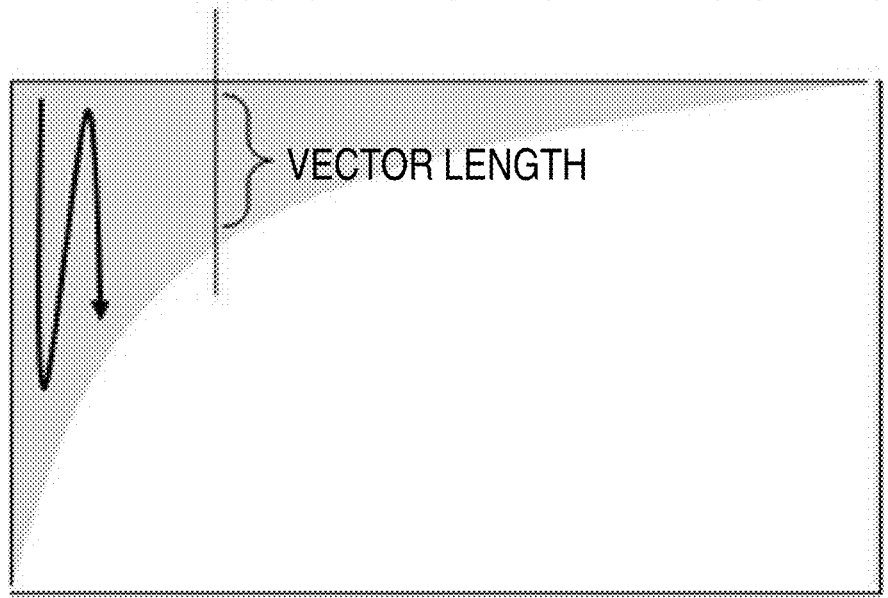
FIG. 14 is an explanatory view of a manner in which a vector length is shortened in JDS format.

Next, an operation by the matrix vector multiplication calculation part 6 will be explained in detail with reference to a flowchart in FIG. 6 and an example in FIG. 7.

Initially, the matrix vector multiplication calculation part 6 calculates matrix vector multiplication products of the matrix in JDS format and a vector (Step B1). Herein, the matrix vector multiplication calculation part 6 does not execute permutation of the results based on the permutation information at that time point.

Also, the matrix vector multiplication calculation part 6 calculates matrix vector multiplication products of the matrix in CRS format and a vector (Step B2). Herein, calculation sequence for Step B1 and Step B2 is not limited to the sequence shown in FIG. 6.

Next, the matrix vector multiplication calculation part 6 calculates sum of the results in Steps B1, B2 (Step B3). Herein, the CRS format matrix has a shorter number of rows. Although the resultant vectors thereby have a small number of elements, the resultant vectors may be summed up in an order starting from 0th element. A remaining section insufficient in the number of elements is regarded as value 0, there is no need of summing up. In a case of FIG. 7, the matrix vector multiplication calculation part 6 sums up 173 of 0th element as a result from the matrix vector multiplication for CRS format and 23 of 0th element as a result from the matrix vector multiplication for JDS format. Similarly, the matrix vector multiplication calculation part 6 sums up 39 of 1st element as a result from the matrix vector multiplication for CRS format and 7 of 1st element as a result from matrix vector multiplication for JDS format.

Next, the matrix vector multiplication calculation part 6 permutates the results based on the row permutation information (Step B4). Thereby, final results from matrix vector multiplication may be obtained.

Herein, in a case where the row sequence in a section to be stored in CRS format is not permutated, the number of resultant elements from matrix vector multiplication is equivalent to the number of rows in the original matrix. In addition, since a permutated result may be obtained in such case, sum is calculated subsequent to permutation of the results from matrix vector multiplication in JDS format.

Effect

According to the calculator 2 of the present exemplary embodiment, as shown in FIG. 2, a section having a sufficient column length is stored in JDS format and the other section is stored in CRS format, thus the vector length may be elongated in both of the sections. Therefore, according to the calculator 2 of the present exemplary embodiment, the vector length may be elongated, and sparse matrix vector multiplication products may be calculated at a high speed.

Modifications

In the above exemplary embodiment, as an example, a partial matrix for the columns having a predetermined number or more of non-zero elements among columns in a matrix is stored in JDS format, and whereas a partial matrix for the other columns is stored in CRS format. However, it is unnecessary to limit to JDS format as the format for storing the partial matrix for the columns having the predetermined number of non-zero elements among the columns the matrix, and it is also allowed to adopt the other format where elements in the matrix are stored in a column major order. For example, CCS (Compressed Column Storage) format and ELLPACK (ELL) format may be also adopted. Similarly, it is unnecessary to limit to CRS format as the format for storing the partial matrix for the other columns, and it is also allowed to adopt any other format where elements in the matrix are stored in a row major order. For example, a format in which JDS format and ELL format are converted into row direction may be adopted.

It is needless to say that technical idea of the present disclosure includes a case where row direction and column direction are replaced each other in the above exemplary embodiments.

The present invention may be applied to a use for, for example, calculation of sparse matrix vector multiplication products using a vector calculator. In addition, the present invention may be applied to a use for calculation of sparse matrix vector multiplication products using a GPU (Graphics Processing Unit). Furthermore, the sparse matrix vector multiplication may be applied to a use for document analysis and recommendation using machine learning, or click frequency prediction for advertisement on a web site, and the like.

Herein, the present invention may encompass the following modes.

Mode 1

As is a mode of an information processing apparatus of the first exemplary embodiment above.

Mode 2

In the mode above,
it is preferable that the first format is a format where elements in the matrix are stored in a column major order.

Mode 3

In the modes above,
it is preferable that the first format is JDS (Jagged Diagonal Storage) format.

Mode 4

In the mode above,
it is preferable that the second format is a format where elements in the matrix are stored in a row major order.

Mode 5

In the modes above,
it is preferable that the second format is CRS (Compressed Row Storage) format.

Mode 6

In the modes above,
the following configuration may be adopted:
the first conversion part left-shifts non-zero elements in the matrix without vacancy, and stores a partial matrix for columns having a predetermined number or more of non-zero elements among columns in the left-shifted matrix in the first format; and
the second conversion part stores a partial matrix for the other columns in the left-shifted matrix in the second format.

Mode 7

In the modes above,
the following configuration may be adopted:
the first conversion part permutates rows in the left-shifted matrix in a descending order in the number of non-zero elements included in each row, and stores a partial matrix for columns having a predetermined number or more of non-zero elements among columns in the permutated descending-order matrix in the first format; and
the second conversion part stores a partial matrix for the other columns in the permutated descending-order matrix in the second format.

Mode 8

In the modes above,
the following configuration may be adopted:
it comprises a matrix vector multiplication calculation part which calculates multiplication products of the partial matrix stored in the first format and a vector, calculates multiplication products of the partial matrix stored in the second format and the vector, and sums up the calculated multiplication products so as to obtain multiplication products of the matrix and the vector.

Mode 9

In the modes above,
it is preferable that the predetermined number is a vector register length of a vector calculator calculating the multiplication products of the matrix and the vector.

Mode 10

In the modes above,
row direction and column direction may be replaced.

Mode 11

In the modes above,
it is preferable that the matrix is a sparse matrix.

Mode 12

In the modes above,
it is preferable that the number of non-zero elements in each column of the matrix follows Zipf distribution.

Mode 13

In the modes above,
it is preferable that the information processing apparatus is a vector calculator.

Mode 14

As is a mode of an information processing method of the second exemplary embodiment above.

Mode 15

In the mode above,
it is preferable that the first format is a format in which elements in the matrix are stored in a column major order.

Mode 16

In the modes above,
it is preferable that the first format is JDS (Jagged Diagonal Storage) format.

Mode 17

In the modes above,
it is preferable that the second format is a format in which elements in the matrix are stored in a row major order.

Mode 18

In the modes above, it is preferable that the second format is CRS (Compressed Row Storage) format.

Mode 19

In the modes above,
it may comprise:
left-shifting non-zero elements in the matrix without vacancy and storing a partial matrix for columns having a predetermined number or more of non-zero elements among columns in the left-shifted matrix in a first format; and
storing a partial matrix for the other columns in the left-shifted matrix in the second format.

Mode 20

In the modes above,
it may comprise:
permutating rows in the left-shifted matrix in a descending order in the number of non-zero elements included in each row, and storing a partial matrix for columns having a predetermined number or more of non-zero elements among columns in the permutated descending-order matrix in the first format; and storing a partial matrix for the other columns in the permutated descending-order matrix in the second format.

Mode 21

In the modes above,
it may comprise:
calculating multiplication products of the partial matrix stored in the first format and a vector;
calculating multiplication products of the partial matrix stored in the second format and the vector; and
summing up the calculated multiplication products so as to obtain multiplication products of the matrix and the vector.

Mode 22

In the modes above,
it is preferable that the predetermined number is a vector register length of a vector calculator calculating the multiplication products of the matrix and the vector.

Mode 23

In the modes above,
row direction and column direction may be replaced each other.

Mode 24

In the modes above,
it is preferable that the matrix is a sparse matrix.

Mode 25

In the modes above,
it is preferable that the number of non-zero elements in each column of the matrix follows Zipf distribution.

Mode 26

As is a mode of data structure of the third exemplary embodiment above.

Mode 27

In the modes above,
it is preferable that the first format is a format in which elements in the matrix are stored in a column major order.

Mode 28

In the mode above,
it is preferable that the first format is JDS (Jagged Diagonal Storage) format.

Mode 29

In the modes above,
it is preferable that the second format is a format in which elements in the matrix are stored in a row major order.

Mode 30

In the modes above,
it is preferable that the second format is CRS (Compressed Row Storage) format.

Mode 31

In the modes above,
the following configuration may be adopted:
left-shifting non-zero elements in the matrix without vacancy, and storing a partial matrix for columns having a predetermined number or more of non-zero elements among columns in the left-shifted matrix in a first format; and
the second conversion part stores a partial matrix for the other columns in the left-shifted matrix in the second format.

Mode 32

In the modes above,
the following configuration may be adopted:
permutating rows in the left-shifted matrix in a descending order in the number of non-zero elements included in each row, and storing a partial matrix for columns having a predetermined number or more of non-zero elements among columns in the permutated descending-order matrix in the first format; and
storing a partial matrix for the other columns in the permutated descending-order matrix in the second format.

Mode 33

In the modes above,
it is preferable that the predetermined number is a vector register length of a vector calculator calculating the multiplication products of the matrix and the vector.

Mode 34

In the modes above,
row direction and column direction may be replaced each other.

Mode 35

In the modes above,
it is preferable that the matrix is a sparse matrix.

Mode 36

In the modes above,
it is preferable that the number of non-zero elements in each column of the matrix follows Zipf distribution.

Mode 37

As is a program of the forth exemplary embodiment above.

Mode 38

In the mode above,
it is preferable that the first format is a format in which elements in the matrix are stored in a column major order.

Mode 39

In the modes above,
it is preferable that the first format is JDS (Jagged Diagonal Storage) format.

Mode 40

In the modes above,
it is preferable that the second format is a format in which elements in the matrix are stored in a row major order.

Mode 41

In the modes above,
it is preferable that the second format is CRS (Compressed Row Storage) format.

Mode 42

In the modes above,
it may cause a computer to execute:
a process of left-shifting non-zero elements in the matrix without vacancy; and storing a partial matrix for columns having a predetermined number or more of non-zero elements among columns in the left-shifted matrix in a first format; and
a process of storing a partial matrix for the other columns in the left-shifted matrix in the second format.

Mode 43

In the modes above,
it may cause a computer to execute:
a process of permutating rows in the left-shifted matrix in a descending order in the number of non-zero elements included in each row, and storing a partial matrix for columns having a predetermined number or more of non-zero elements among columns in the permutated descending-order matrix in the first format; and
a process of storing a partial matrix for the other columns in the permutated descending-order matrix in the second format.

Mode 44

In the modes above,
it may cause a computer to execute:
a process of calculating multiplication products of the partial matrix stored in the first format and a vector;
a process of calculating multiplication products of the partial matrix stored in the second format and a vector; and
a process of summing up the calculated multiplication products so as to obtain multiplication products of the matrix and the vector.

Mode 45

In the modes above,
it is preferable that the predetermined number is a vector register length of a vector calculator calculating the multiplication products of the matrix and the vector.

Mode 46

In the modes above, row direction and column direction may be replaced each other.

Mode 47

In the modes above,
it is preferable that the matrix is a sparse matrix.

Mode 48

In the modes above,
it is preferable that the number of non-zero elements in each column of the matrix follows Zipf distribution.

The disclosure of the above identified Patent Literatures and non Patent Literature is incorporated herein by reference thereto. Modification and adjustment of the exemplary embodiments and examples may be made within an ambit of the entire disclosure of the present invention (including claims) and based on its basic technological idea. In addition, various combinations and selections (including partial deletion) of various disclosed components (including each element of each claims, each element described in each exemplary embodiment and Examples and each element shown in each figure) may be made within the ambit of Claims of the present invention. That is, the present invention includes a variety of modifications and corrections which may be made by a person skilled in the art according to the entire disclosure including the claims and the technical idea or concept. Particularly, numerical ranges described in the present document should be recognized as concretely described even if any numerical value or small ranges within the ranges are not explicitly described.

REFERENCE SIGNS LIST 2 calculator
4 matrix format conversion part
6 matrix vector multiplication calculation part
8 information processing apparatus
10 first conversion part
12 second conversion part

The invention claimed is:

1. An information processing apparatus, comprising:
a first conversion part storing a partial matrix for columns having a predetermined number or more of non-zero elements among columns in a matrix in a first format; and
a second conversion part storing a partial matrix for the other columns in the matrix in a second format,
wherein the first format is a format in which elements in the matrix are stored in a column major order and the second format is a format in which elements in the matrix are stored in a row major order.

2. The information processing apparatus of claim 1, wherein the first format is JDS (Jagged Diagonal Storage) format.

3. The information processing apparatus of claim 2, wherein the second format is a format in which elements in the matrix are stored in a row major order.

4. The information processing apparatus of claim 2, wherein
the first conversion part left-shifts non-zero elements in the matrix, and stores a partial matrix for columns having a predetermined number or more of non-zero elements among columns in the left-shifted matrix in the first format; and
the second conversion part stores a partial matrix for the other columns in the left-shifted matrix in the second format.

5. The information processing apparatus of claim 2, comprising
a matrix vector multiplication calculation part which calculates multiplication products of the partial matrix stored in the first format and a vector, calculates multiplication products of the partial matrix stored in the second format and the vector, and sums up the calculated multiplication products so as to obtain multiplication products of the matrix and the vector.

6. The information processing apparatus of claim 1, wherein the second format is CRS (Compressed Row Storage) format.

7. The information processing apparatus of claim 6, wherein
the first conversion part left-shifts non-zero elements in the matrix, and stores a partial matrix for columns having a predetermined number or more of non-zero elements among columns in the left-shifted matrix in the first format; and
the second conversion part stores a partial matrix for the other columns in the left-shifted matrix in the second format.

8. The information processing apparatus of claim 6, comprising
a matrix vector multiplication calculation part which calculates multiplication products of the partial matrix stored in the first format and a vector, calculates multiplication products of the partial matrix stored in the second format and the vector, and sums up the calculated multiplication products so as to obtain multiplication products of the matrix and the vector.

9. The information processing apparatus of claim 1, wherein
the first conversion part left-shifts non-zero elements in the matrix, and stores a partial matrix for columns having a predetermined number or more of non-zero elements among columns in the left-shifted matrix in the first format; and
the second conversion part stores a partial matrix for the other columns in the left-shifted matrix in the second format.

10. The information processing apparatus of claim 9, comprising
a matrix vector multiplication calculation part which calculates multiplication products of the partial matrix stored in the first format and a vector, calculates multiplication products of the partial matrix stored in the second format and the vector, and sums up the calculated multiplication products so as to obtain multiplication products of the matrix and the vector.

11. The information processing apparatus of claim 1, comprising
a matrix vector multiplication calculation part which calculates multiplication products of the partial matrix stored in the first format and a vector, calculates multiplication products of the partial matrix stored in the second format and the vector, and sums up the calculated multiplication products so as to obtain multiplication products of the matrix and the vector.

12. The information processing apparatus of claim 1, wherein
the first conversion part left-shifts non-zero elements in the matrix, and stores a partial matrix for columns having a predetermined number or more of non-zero elements among columns in the left-shifted matrix in the first format; and
the second conversion part stores a partial matrix for the other columns in the left-shifted matrix in the second format.

13. The information processing apparatus of claim 1, wherein
the first conversion part left-shifts non-zero elements in the matrix, and stores a partial matrix for columns having a predetermined number or more of non-zero elements among columns in the left-shifted matrix in the first format; and
the second conversion part stores a partial matrix for the other columns in the left-shifted matrix in the second format.

14. The information processing apparatus of claim 1, comprising
a matrix vector multiplication calculation part which calculates multiplication products of the partial matrix stored in the first format and a vector, calculates multiplication products of the partial matrix stored in the second format and the vector, and sums up the calculated multiplication products so as to obtain multiplication products of the matrix and the vector.

15. The information processing apparatus of claim 1, comprising
a matrix vector multiplication calculation part which calculates multiplication products of the partial matrix stored in the first format and a vector, calculates multiplication products of the partial matrix stored in the second format and the vector, and sums up the calculated multiplication products so as to obtain multiplication products of the matrix and the vector.

16. An information processing method, comprising:
storing a partial matrix for columns having a predetermined number or more of non-zero elements among columns in a matrix in a first format; and
storing a partial matrix for the other columns in the matrix in a second format,
wherein the first format is a format in which elements in the matrix are stored in a column major order and the second format is a format in which elements in the matrix are stored in a row major order.

17. A data structure having features:
to store a partial matrix for columns having a predetermined number or more of non-zero elements among columns in a matrix in a first format; and
to store a partial matrix for the other columns in the matrix in a second format,
wherein the first format is a format in which elements in the matrix are stored in a column major order and the second format is a format in which elements in the matrix are stored in a row major order.

* * * * *